United States Patent [19]

Chitayat

[11] Patent Number: 4,571,799
[45] Date of Patent: Feb. 25, 1986

[54] METHOD FOR PRODUCING AIR BEARING PADS FOR POSITIONING TABLE

[75] Inventor: Anwar Chitayat, Plainview, N.Y.

[73] Assignee: Anorad Corporation, Hauppauge, N.Y.

[21] Appl. No.: 411,595

[22] Filed: Aug. 26, 1982

Related U.S. Application Data

[62] Division of Ser. No. 218,930, Dec. 22, 1980, Pat. No. 4,392,642.

[51] Int. Cl.$^4$ ............................................. B21D 53/10
[52] U.S. Cl. ................................. 29/149.5 A; 248/424; 108/137; 108/150; 108/67; 269/71; 269/285
[58] Field of Search ................... 29/149.5 A, 149.5 R, 29/527.4, 527.2, 527.1, 557, 558; 269/71, 73, 285, 286; 308/DIG. 1, 3 A, 160, 9, 5 R; 108/137; 248/424, 425, 429

[56] References Cited

U.S. PATENT DOCUMENTS

| | | | |
|---|---|---|---|
| 4,129,930 | 12/1978 | Dragt | 29/149.5 R |
| 4,234,175 | 11/1980 | Sato et al. | 269/73 |
| 4,392,642 | 7/1983 | Chitayat | 269/73 |

Primary Examiner—Howard N. Goldberg
Assistant Examiner—Vernon K. Rising
Attorney, Agent, or Firm—Thomas R. Morrison

[57] ABSTRACT

Air bearing pads for supporting a one-axis table in a granite bridge positioning apparatus on a thin film of air include machine-thinned sections for providing resilience to the pads in order to permit flexing sufficient to accommodate surface irregularities on the supporting surface. A single air pressure regulator provides a source of pressurized air to flow-control devices of a plurality of air bearing pads supporting a one-axis table. The individual flow-control devices adjust the flow of air to their respective air bearing pads to individually adjust the lift of the pads.

2 Claims, 5 Drawing Figures

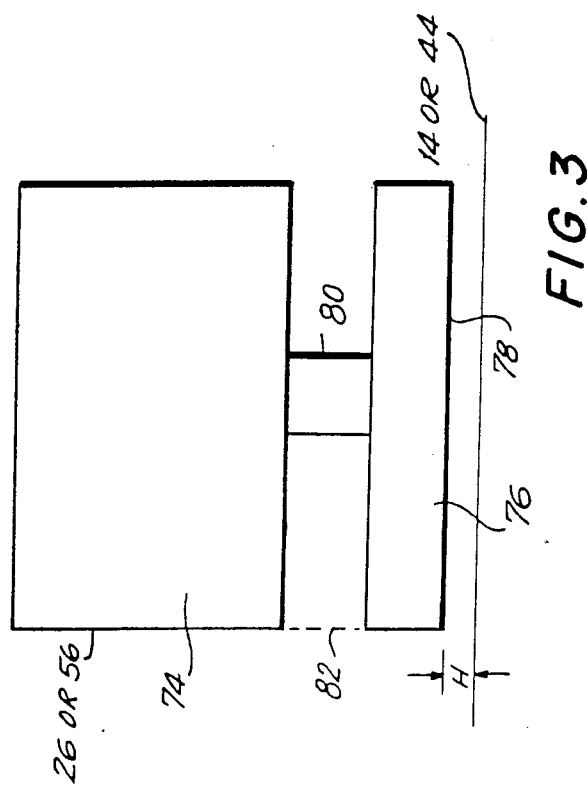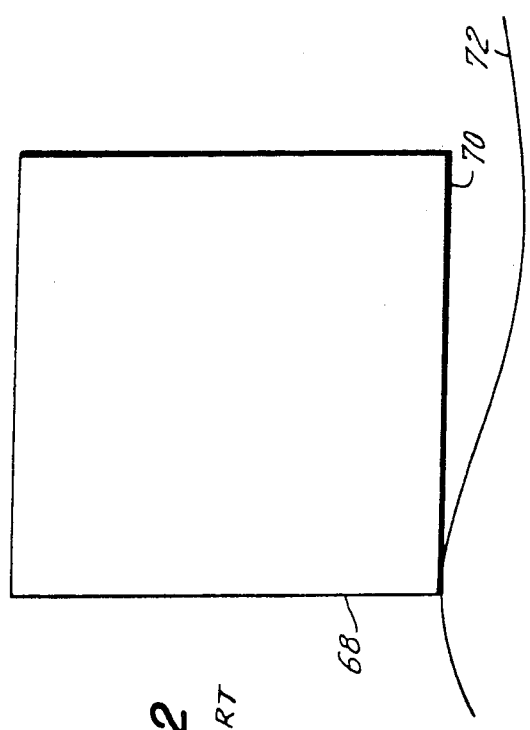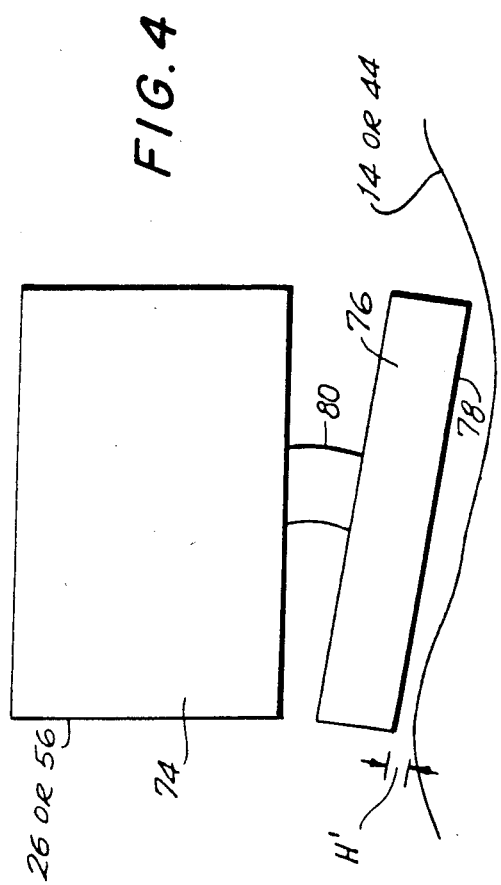

METHOD FOR PRODUCING AIR BEARING PADS FOR POSITIONING TABLE

This application is a division of application Ser. No. 218,930, filed Dec. 22, 1980, now U.S. Pat. No. 4,392,642.

BACKGROUND OF THE INVENTION

The present invention is related to positioning apparatus and, more particularly, to positioning apparatus including at least one table linearly movable along an axis and supported by air bearing pads.

Workpiece positioning tables and, in particular, massive workpiece positioning tables servocontrolled for motion along a linear axis, are commonly supported by air bearing pads and are guided in the linear direction by air guide bearings facing opposing sides of a straightedge. In one type of such workpiece positioning tables, the air bearing pads are supported on a film of air above a ground and lapped granite surface. The flatness of the surface permits a very thin layer of air, typically a few 10,000th of an inch, to support a table having a substantial weight.

However, even precisely ground and lapped granite has certain unavoidable surface irregularities therein which require a greater average height of the air bearing pads above the granite surface than is otherwise desirable for accuracy of positioning.

OBJECTS AND SUMMARY OF THE INVENTION

Accordingly, it is an object of the present invention to provide a workpiece positioning table which overcomes the drawbacks of the prior art.

It is a further object of the invention to provide a workpiece positioning table including air bearing pads which have means for permitting the bottom surface of the air bearing pads to deflect sufficiently to remain substantially parallel to a supporting surface which has slight undulations or departures from flatness therein.

It is a further object of the invention to provide a workpiece positioning table having a granite slab supporting a bridge in which a table adapted for holding a workpiece is movable on the slab under the bridge and a second table is movable on a flat top surface of the bridge to support an optical or machining apparatus at any XY position with respect to the workpiece. Each of the two tables is supported on a plurality of air bearing pads each of which includes means for permitting the deflection of the bottom surface thereof to accommodate imperfections in flatness in the surface above which it is being supported.

It is a further object of the invention to provide a method for producing precise air bearing pads including means for permitting deflection of the bottom surface thereof to accommodate imperfections in the surface above which it is supported.

It is a further object of the invention to provide a workpiece positioning table including a granite bridge having a ground and lapped flat top surface for supporting one table movable along a first axis and a granite slab upon which the granite bridge rests supporting a second movable table which is movable along a second axis under the bridge. Each of the tables on the first and second axes are supported on air bearing pads which receive air whose pressure is regulated by a single pressure regulator and which subsequently passes through individually adjusted flow control valves for controlling the lift or height to which the individual air bearing pads become elevated above the surface.

According to an aspect of the invention, there is provided an air bearing pad for supporting a load above a flat surface comprising an upper portion attached to the load, a lower portion, a flat bottom surface on the lower portion adapted for facing the flat surface, a neck portion joining centers of the upper and lower portions together, means for delivering air to the bottom surface whereby the flat bottom surface is supported above the flat surface on a film of air, the neck portion having a cross section small enough to permit elastic deformation thereof to accommodate irregularities in the flat surface, and the upper portion, lower portion and neck portion being formed of a single piece of metal.

According to a feature of the invention, there is provided a method of making an air bearing pad of the type having an upper portion, a lower portion and a neck portion joining centers of the upper and lower portions comprising forming a block of metal having bottom surface, forming air channels in the block of metal terminating in the bottom surface, grinding and lapping the bottom surface, machining the block of metal to form the neck portion, and the machining step being performed without applying sufficient stress to the block of metal to permanently change a relationship of the ground and lapped bottom surface with respect to the upper portion.

According to another feature of the invention, there is provided a method of making a set of air bearing pads for supporting a load at a plurality of locations above a surface, comprising forming a plurality of substantially identical blocks of metal each having a bottom surface, grinding and lapping all of the bottom surfaces as a set whereby the blocks of metal remain substantially identical, machining each of the blocks of metal to form a neck portion joining a center of an upper portion to a center of a lower portion, the bottom surface being on the lower portion, forming air channels in the lower portion terminating in the bottom surface, the machining step being performed without applying sufficient stress to any of the blocks of metal to permanently change a relationship of the ground and lapped bottom surfaces thereof with respect to the remainder of the set of air bearing pads.

According to a further feature of the invention, there is provided a workpiece positioning table comprising a granite slab having a first horizontal ground and lapped top surface, a sraightedge affixed to the top surface and defining a first horizontal axis, first and second opposed edges on the straightedge, a first table, a first plurality of air bearing pads on the first table effective to support the first table above the top surface on films of air, a first plurality of air guide bearings facing the first and second opposed edges and effective to guide the first table for motion along the first axis, a U-shaped granite bridge having first and second legs resting on the top surface, a U-shaped cavity between the first and second legs providing clearance for passage thereinto of the first table, a ground and lapped horizontal second top surface on the granite bridge, the second top surface being parallel to the first-mentioned top surface, a second table, a plurality of air bearing pads on the second table effective to support the second table above the second top surface on films of air, a second straightedge affixed to the second top surface and defining a second horizontal axis orthogonal to the first horizontal axis, third and fourth opposed edges on the second straightedge, a second plurality of air guide bearings facing the third and fourth opposed edges and effective to guide the second table for motion along the second axis, and each of the air bearing pads being formed of a single block of metal and including means for permitting deflection of bottom surfaces thereof to accommodate irregularities in the surface above which it is supported.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a side view of an air bearing pad according to the prior art in association with an irregular surface;

FIG. 3 is a side view of an air bearing pad of the workpiece positioning table of FIG. 1;

FIG. 4 is a side view of an air bearing pad showing the deflection of the bottom surface thereof highly exaggerated.

DETAILED DESCRIPTION OF THE PREFERRED EMBODIMENTS

Figure 1:
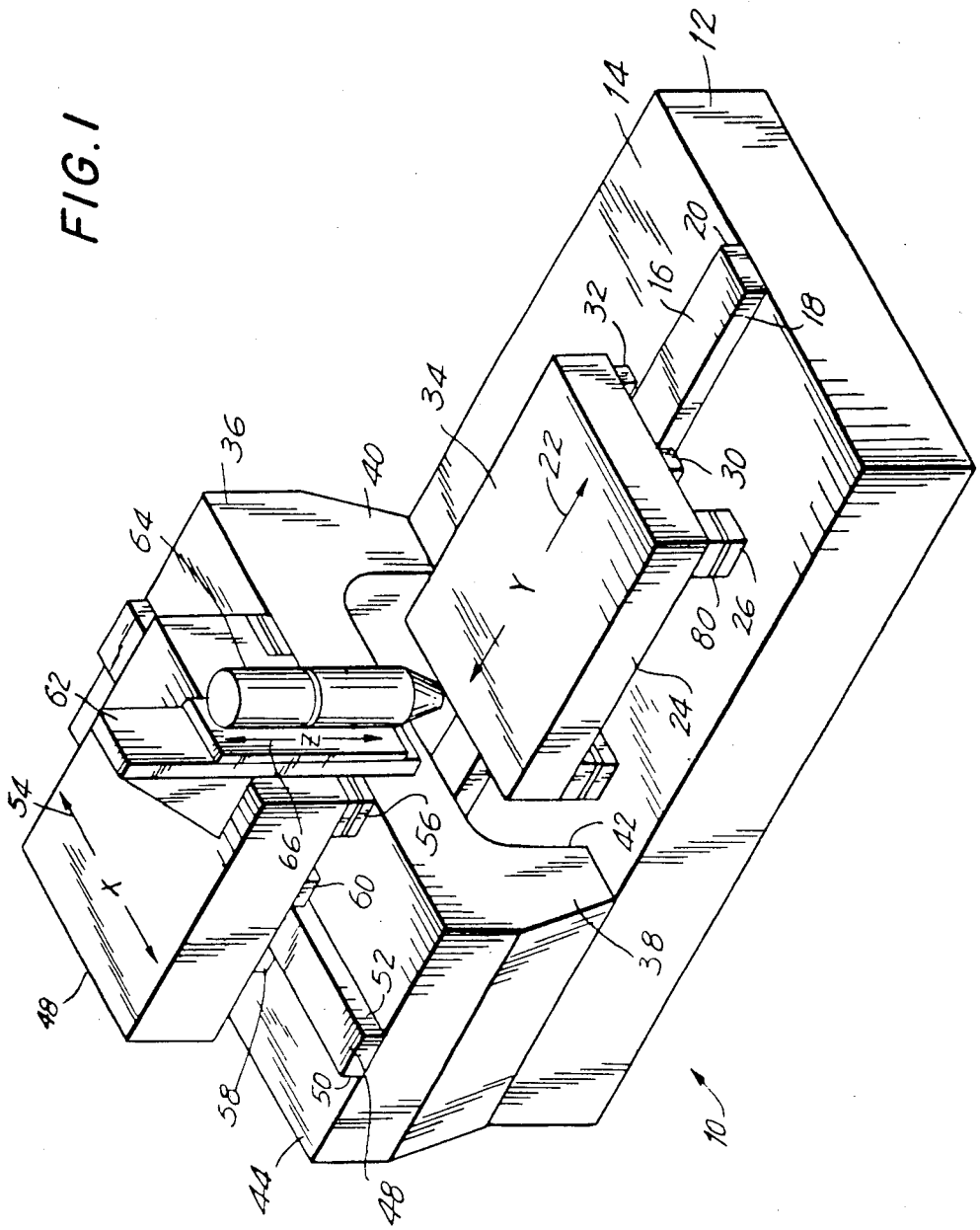
FIG. 1 is a perspective view of a workpiece positioning table according to an embodiment of the present invention.

Referring now to FIG. 1, there is shown, generally at 10, a three-axis positioning table according to an embodiment of the present invention. A massive laboratory grade granite slab 12 forms the base of positioning table 10 and may be supported by conventional means on a weight-bearing floor, on piers or pilings (not shown). Granite slab 12 has a top surface 14 which is ground and lapped for ultraflatness to provide a very stable base having an almost diamondhard plane surface which is the reference surface for all axes of positioning table 10.

Granite is especially suited for this application since it has good vibration dumping characteristics, large thermal inertia and a low coefficient of expansion, thus minimizing dimensional changes due to temperature changes. Since granite has been aged and stress relieved over millions of years, it is extremely insensitive to dimensional creep caused by prolonged stress or temperature change.

A straightedge 16 having opposed edges 18 and 20, which have also been ground and lapped, is affixed along the center of top surface 14 to define a Y axis as shown by arrows 22. Although the preferred embodiment employs granite in slab 12 and straightedge 16, other materials such as, for example, steel, may be employed without departing from the spirit of the present invention.

A Y table 24 is supported on top surface 14 by a plurality of air bearing pads 26. As is conventional, three air bearing pads 26 are employed to support Y table 24. That is, two air bearing pads are disposed at extremities of one edge of Y table 24 and a single air bearing pad (hidden by Y table 24 in FIG. 1) is disposed in the center of the other edge of Y table 24. Source of pressurized air (not shown) are fed to orifices in the bottom of air bearing pads 26 to raise air bearing pads 26 a small distance, nominally a few 10,000th of an inch, on a film of air above top surface 14 of granite slab 12.

A pair of air guide bearings 30 and 32 face opposed edges 18 and 20, respectively, of straightedge 16. Air guide bearings 30 and 32 are preloaded toward edges 18 and 20 and a source of air pressure (not shown) is employed to produce a film of air between their surfaces and edges 18 and 20 of straightedge 16 to provide accurate guidance of one end of Y table 24.

A second pair of air guide bearings (hidden by Y table 24 in FIG. 1) are disposed at the other end of Y table 24 to guide Y table 24 accurately along the Y axis.

Y table 24 includes a top surface 34 upon which an object to be inspected or otherwise operated upon may be installed.

A massive bridge 36, preferably of granite, includes first and second legs 38 and 40 which rest upon the edges of top surface 14 of granite slab 12 and which form a U-shaped cavity 42 therebetween having sufficient dimensions to permit Y table 24 to pass therethrough as well as having ample side and top clearance for objects on top surface 34 of Y table 24.

Bridge 36 includes a top surface 44 which has been ground and lapped to provide an accurate reference plane for an X table 46. Surface 44 is accurately parallel to surface 14 and, since there is no relative motion therebetween, the initial parallel condition between surfaces 44 and 14 remains throughout the life of the apparatus.

A straightedge 48, preferably of granite and having ground and lapped edges 50 and 52, is disposed on top surface 44 to define an X axis as indicated by X-axis arrows 54.

X table 46 is preferably of granite and is supported on a plurality of air bearing pads 56 elevated on a film of air above top surface 44 by a supply of air pressure (not shown). Air guide bearings 58 and 60 are opposed to edges 50 and 52, respectively, of straightedge 48 to constrain motion of X table 46 in the direction of X-axis arrows 54. An additional pair of air guide bearings (hidden by X table 46) are disposed at the opposite end of X table 46 for guidance of X table 46.

One or more Z-slides 62 may be employed to position an optical or other apparatus 64 in the direction indicated by Z arrows 66. Z-slide 62 overhangs the edge of X table 46 and bridge 36 and may be vertically positioned in any desired location with respect to top surface 34 of Y table 24.

Drive means and position measuring means (not shown) associated with Y table 24, X table 46 and Z-slide 62 may be used to provide drive and feedback signals for servomotors (not shown) associated with moving these elements along their axes. Since these means are conventional, they will not be further discussed in detail.

Referring now to FIG. 2, there is shown an air bearing pad 68 which may have been employed in the prior art. A flow of air through a bottom surface 70 elevates bottom surface 70 above a top surface 72 supporting air bearing pad 68 and the load (not shown) upon it. Top surface 72 may contain irregularities or dirt represented by the highly vertically exaggerated undulation of top surface 72. Although the ground and lapped surfaces in the present invention are ultraflat, accuracy requires that bottom surface 70 be no more than a few 10,000th of an inch above top surface 72. Consequently, even very slight undulations or irregularities in surface 72 can tend to cause contact between bottom surface 70 and top surface 72 or, at the least, can produce a force vector in the horizontal direction which interferes with accurate positioning.

Referring now to FIG. 3, air bearing pad 26 for 56 is a unitary steel member having an upper portion 74 which is affixed to the underside of its respective table 24 or 46 and a lower portion 76 having a bottom surface 78 through which air is directed to flow to maintain bottom surface 78 a predetermined height H above top surface 14 or 44. Lower portion 76 is joined to upper portion 74 by a reduced neck portion centrally disposed with respect to upper and lower portions 74 and 76.

Air bearing pad 26 or 56 is initially formed as a unitary block of material, which may be a parallelepiped whose perimeter is defined by dashed lines 82. Air bearing pads 26 or 56 are selected in sets of three or four for use in supporting a particular table and the set of three air bearing pads 26 or 56 have their bottom surfaces 78 ground and lapped as a set for precise uniformity of bottom surfaces 78.

After grinding and lapping bottom surface 78, the unitary block of material is machined to remove the material between dashed line 82 and neck portion 80 to provide a relatively weaker section in neck portion 80 which is capable of slight lateral deformation. The machining, of course, must be done under conditions wherein the stress imposed on the material is insufficient to produce a strain exceeding the elastic deformation limit of the material. Thus, the precise relationship of bottom surface 78 with respect to the remainder of air bearing pad 26 or 56 and between the three air bearing pads in a set, is retained following the removal of material to produce neck portion 80.

Referring now to FIG. 4, there is shown an air bearing pad 26 or 56 on an undulating surface (highly exaggerated) 14 or 44 and bearing the normal load of a granite table 24 or 46 which may weigh several hundred pounds. It will be noted that neck portion 80 is elastically deformed so that lower portion 76 and bottom surface 78 lies generally parallel to the local irregularities in surface 14 or 44. Thus, the average lift H' which must be produced by air bearing pad 26 or 56 to clear high points in surface 14 or 44 is reduced. With reduced lift height H', more precise positioning of the respective table can be achieved.

Figure 5:
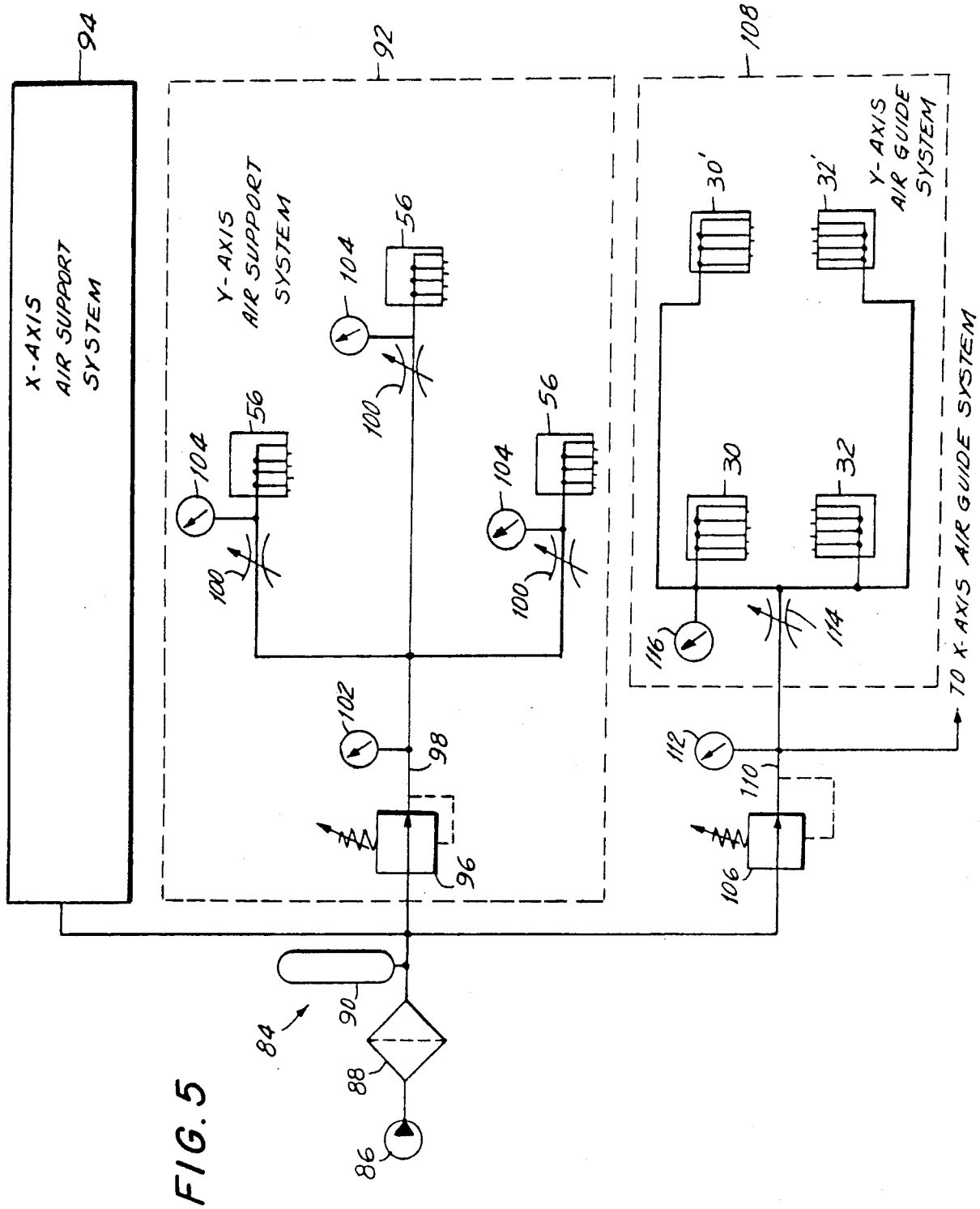
FIG. 5 is a schematic diagram of an air system for the workpiece positioning table of FIG. 1.

Referring now to FIG. 5, there is shown an air system 84 for both supporting and guiding the X and Y tables of the apparatus of FIG. 1. An air pump 86, which may be of the displacement or rotary type, feeds pressurized air through an optional filter 88 to an air pressure reservoir 90. Pressurized air from air pressure reservoir 90 is fed to a Y-axis air support system 92 and to an X-axis air support system 94. Y-axis air support system 92 and X-axis air support system 94 are identical and therefore only Y-axis air support system 92 will be described in detail.

An air pressure regulator 96 reduces the air pressure fed to it to a substantially constant value which it feeds on its output line 98 to three adjustable flow control valves 100. An air pressure gauge 102 may optionally be provided to monitor pressure in output line 98.

Each of flow control valves 100 controls the amount of air flow therethrough fed to its respective air bearing pad 56. Since the pressure at the input side of each flow control valve 100 is maintained substantially constant by air pressure regulator 96, and the flow rate through its respective air bearing pad 56 is determined by the fixed geometry of its air bearing pad 56, the air pressure applied to its air bearing pad 56 is controlled by the setting or adjustment of flow control valve 100. A pressure gauge 104 on the output of each flow control valve 100 may optionally be provided to determine the pressure applied to the respective air bearing pad 56.

By individual adjustment of flow control valves 100, the height or lift which is provided by the respective air bearing pads 56 may be independently controlled. For example, if air bearing pads 56 have a surface area of 12 in.$^2$ facing the support surface and a gap of 2.5 ten thousandths of an inch is desired between air bearing pad 56 and the surface supporting it with a 600-pound weight bearing down on three air bearing pads, a pressure of about 25 PSI to the single air bearing pad on one side of the Y table and 12.5 PSI to each of the pair of air bearing pads 56 on the other side of the Y table will achieve the desired lift. Using regulated pressure on output line 98 of about 42 PSI, appropriate adjustment of flow control valves 100 may be employed to produce the requisite equal lift by all three air bearing pads 56.

Air pressure from reservoir 90 is also applied through an air pressure regulator 106 to a Y-axis air guide system 108 and an X-axis air guide system which is identical to Y-axis air guide system 108 and is therefore not shown or described.

Air pressure regulator 106 provides a substantially constant air pressure on its output line 110 which may be monitored by an optional pressure gauge 112. A flow control valve 114 controls the flow and consequent pressure of air fed to air guide bearings 30,32,30' and 32'. This last mentioned air pressure may be monitored on a pressure gauge 116. The pressure applied to an opposing pair of air guide bearings such as, for example, air guide bearings 30 and 32, determines the stiffness with which Y table (not shown) is maintained aligned for motion along the Y axis. This stiffness is thus controlled by the setting of flow control valve 114.

Instead of having a single flow control valve 114 feeding all four air guide bearings 30,32,30' and 32', flow control valve 114 may be deleted and individual flow control valves (not shown) may be installed in the lines leading to each individual air guide bearings 30,32,30' and 32'. This latter arrangement which is, in fact, the preferred embodiment, permits adjustment of the gap between each air guide bearings and its adjacent edge of the straightedge along which it is being guided.

Air system 84 offers the advantage that six air bearing pads and eight air guide bearings may be individually controlled using only three air pressure regulators 96 and 106 (including an air pressure regulator 96 in X-axis air support system 94). Previously, individual regulators where required at least for each of air bearing pads 56 as well as one or more regulators for the air guide systems. Since flow control valves 100 and 114 are considerably less expensive than air pressure regulators 96 and 106, a significant saving is achieved.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of making an air bearing pad of the type having an upper portion, a lower portion and a neck portion joining centers of said upper and lower portions, said air bearing pad being of a type having air channels therein terminating in a bottom surface thereof, comprising:

forming a block of metal having said bottom surface;

grinding and lapping said bottom surface;

then machining said block of metal to form said neck portion;

performing the machining step by machining said block of metal to a predetermined reduced limit, and thereby causing said neck portion to include a section which is relatively weaker than a remainder of said block of metal and thus capable of slight lateral deformation with respect to said remainder; and performing the machining step without applying sufficient stress to said block of metal to produce a strain exceeding an elastic deformation limit of the material forming said neck portion whereby a relationship of said ground and lapped bottom surface with respect to said upper portion is retained.

2. A method of making a set of air bearing pads for supporting a load at a plurality of locations above a surface, said air bearing pads being of a type having air channels therein terminating in a bottom surface thereof, comprising:

forming a plurality of substantially identical blocks of metal each having said bottom surface;

grinding and lapping all of said bottom surfaces as a set whereby said blocks of metal remain substantially identical;

then machining each of said blocks of metal to form a neck portion joining a center of an upper portion to a center of a lower portion, said bottom surface being on said lower portion;

performing the machining step by machining each of said blocks of metal to respective predetermined reduced limits, and thereby causing each of said neck portions thereof to include a section which is relatively weaker than a remainder of said each of said blocks of metal, and thus capable of slight lateral deformation with respect to said remainder; and performing the machining step without applying sufficient stress to any of said blocks of metal to produce a strain exceeding an elastic deformation limit of the material forming said neck portion whereby a relationship of said ground and lapped bottom surfaces thereof with respect to said remainder of said set of air bearing pads is retained.

* * * * *